United States Patent [19]
Grube et al.

[11] Patent Number: 6,104,925
[45] Date of Patent: Aug. 15, 2000

[54] METHOD AND APPARATUS FOR ESTABLISHING GROUP COMMUNICATIONS BETWEEN SUBSCRIBERS AFFILIATED WITH TERRESTRIAL AND SATELLITE COMMUNICATION SYSTEMS

[75] Inventors: Gary Grube, Barrington; Eric Ziolko, Schaumburg; Paul Bocci, Roselle, all of Ill.

[73] Assignee: Motorola, Inc., Schaumburg, Ill.

[21] Appl. No.: 09/014,524

[22] Filed: Jan. 28, 1998

[51] Int. Cl.[7] .............................. H04Q 7/20; H04B 1/38; H04B 7/185; H04M 1/00
[52] U.S. Cl. ................... 455/428; 455/427; 455/430; 455/445; 455/560; 455/12.1
[58] Field of Search .................. 455/12.1, 13.1, 455/13.2, 13.3, 427, 428, 429, 430, 445, 446, 448, 449, 507, 517, 524, 525, 560; 342/382; 370/316

[56] References Cited

U.S. PATENT DOCUMENTS

| | | | |
|---|---|---|---|
| 5,040,337 | 8/1991 | Barnes et al. ........................... | 455/8 |
| 5,216,427 | 6/1993 | Yan et al. ............................. | 342/352 |
| 5,535,432 | 7/1996 | Dent ..................................... | 455/77 |
| 5,594,780 | 1/1997 | Wiedeman et al. ..................... | 455/430 |
| 5,835,857 | 11/1998 | Otten ..................................... | 455/410 |
| 5,903,837 | 5/1999 | Wiedeman ............................. | 455/427 |
| 5,946,619 | 8/1999 | Kolev .................................... | 455/432 |

Primary Examiner—Dwayne D. Bost
Assistant Examiner—Raymond Persino
Attorney, Agent, or Firm—Steven R. Santema

[57] ABSTRACT

Group communications between subscribers (20, 22) affiliated with a terrestrial communication system (12, 14) and subscribers (46, 48) affiliated with a satellite communication system (10) is begun when a subscriber has initiated a group communication request. The request is provided, via a controller (i.e., a terrestrial system controller or satellite system controller depending on which communication system the requesting subscriber is affiliated with), to a systems interface (36). Upon receiving the request, the systems interface determines whether subscribers that are identified to participate in the group communication are located in the terrestrial system and/or the satellite system. If the group of subscribers have members in both communication systems, the systems interface establishes satellite communication links for each subscriber affiliated with the satellite communication system and establishes a terrestrial communication link for subscribers affiliated with a terrestrial communication system. Once the communication links are established, the systems interface arbitrates transmissions of the group of subscribers. The arbitration of transmissions insures that each subscriber in the group of subscribers receives the transmission.

32 Claims, 8 Drawing Sheets

METHOD AND APPARATUS FOR ESTABLISHING GROUP COMMUNICATIONS BETWEEN SUBSCRIBERS AFFILIATED WITH TERRESTRIAL AND SATELLITE COMMUNICATION SYSTEMS

TECHNICAL FIELD OF THE INVENTION

This invention relates generally to communication systems and more particularly to satellite and terrestrial communication systems.

BACKGROUND OF THE INVENTION

Communication systems are known to include a plurality of subscribers and supporting infrastructure. For wireless communication systems, the plurality of subscriber units may be cellular telephones, mobile radios, portable radios, wireless personal digital assistants, personal computers equipped with a wireless modem, or any other device that receives and/or transmits information via a wireless RF communication path. The supporting infrastructure for a wireless communication system includes a system controller, a plurality of base station controllers, and a plurality of base stations. For terrestrial wireless communication systems, the plurality of base stations is distributed throughout a geographic region. Groups of the base stations are coupled to a base station controller wherein the base station controller provides control functionality for the group of base stations. Groups of base station controllers are coupled to the system controller wherein the system controller controls the overall functionality of the terrestrial communication system.

In satellite communication systems, the base stations are located on a satellite that orbits the earth. Each satellite may function as a plurality of base stations and base station controller, which communicate with a satellite system controller that is on the ground. Satellite communication systems are designed for supporting communications between subscribers located anywhere in the world. In contrast, terrestrial wireless communication systems generally provide services for subscribers within a geographical location. Such a geographical location may be limited to a town, city, county, state, and/or country and/or continent. Of the terrestrial communication systems there are two basic types, cellular and land mobile (or two-way). A cellular wireless communication system provides one-to-one communications for its subscribers, while a land mobile communication system provides one to many, many to one, and one to one communications for its subscribers.

There are two types of land mobile wireless systems, public wireless systems and private wireless systems. A public land mobile wireless system is operated by an independent entity that sells time on the wireless system to a plurality of subscribers. As such, a service provider would sell airtime to subscribers such as taxicab companies, trucking companies, delivery companies, etc. Private wireless communication systems, however, are owned and operated by the same entity. As such, subscribers do not pay to utilize the wireless system.

As is known, land mobile two-way communication systems provide dispatch services by providing a dispatch overlay. This allows inbound voice packets from a single control access transmission unit (e.g., a dispatcher) to be routed to a packet switch and a packet duplicator where the packet duplicator generates N copies of the inbound voice packets. The N copies are sent to base station transmitter sites where the wireless links are used to carry the repeated voice packets to targeted subscribers. This approach provides fast one to many half-duplex communications, but currently only provides such services for like subscribers, i.e., subscribers of the same communication system.

As is also known, a land mobile wireless communication system provides seamless wireless communications within its coverage area. To extend the coverage area of a single system, communication systems are linked together such that subscribers may roam from one system to another and continue to receive seamless wireless services. Typically, to establish the link between the two communication systems, a high data rate transmission link is established, such as a T1 link, microwave link, etc. Such linking is usually done between public land mobile systems, where each system provider collects revenue when a subscriber of another system utilizes its communication resources. To further extend wireless services to subscribers in non-coverage areas of a public system, or public system network, the public systems may obtain resources from private systems. Thus, when a communication is occurring between subscribers in a private system and subscribers in a public system, a conference bridge is established. The conference bridge sums the transmissions generated by the subscribers, which must include a high quality audio vocoder (e.g., 13 kbps). In most communication systems, subscribers include a lower quality audio vocoder (e.g., in the range of 2 kbps to 4 kbps).

As an alternative to establishing a conference bridge between communication systems, a communication system gateway may be utilized. The gateway maps the IDs of subscribers from one communication system to another. The gateway evokes the mapping and facilitates allocation of RF communication resources in both systems when it receives a call request. Once the resources have been allocated, the gateway facilitates the call by replicating the transmissions of both systems and providing them to the other system. While this method works well to process communications between different systems, it has a centralized replication of communications which for some communication systems, such as SMARTZONE and IDEN systems by Motorola, Inc., perform the replication within their own networks. As such, the replication is redundant.

While the above techniques provide extended coverage areas for subscriber units beyond their own communication system, there are still geographic areas in which terrestrial systems do not provide services. Such geographical areas are typically low in population density such that establishing a complete wireless communication system is cost prohibitive. In these areas, a subscriber is only able to subscribe to a satellite communication system such as an IRIDIUM Satellite Communication System. The IRIDIUM system teaches the use of a global coverage satellite system as fill-in for spotty terrestrial cellular systems. It uses dual mode subscriber radios and its HLR ("Home Location Register") concept allows for one number calling anywhere, even if the user/unit is in the coverage area of a lower cost per unit of air time terrestrial system. This scheme is for individual one-to-one calls only and it utilizes GSM mapping protocols. It, however, does not support instant access calls to satellite units nor to terrestrial two-way wireless land mobile systems.

Therefore, a need exists for a method and apparatus that extends two-way land mobile communication services into remote geographic areas that are not covered by terrestrial communication systems by linking terrestrial communication systems with satellite communication systems.

DESCRIPTION OF A PREFERRED EMBODIMENT

Generally, the present invention provides a method and apparatus for establishing group communications between subscribers affiliated with a terrestrial communication system and subscribers affiliated with a satellite communication system. This is accomplished once a subscriber has initiated a group communication request. The request is provided, via a controller (i.e., a terrestrial system controller or satellite system controller depending on which communication system the requesting subscriber is affiliated with), to a systems interface. Upon receiving the request, the systems interface determines whether subscribers that are identified to participate in the group communication are located in the terrestrial system and/or the satellite system. If the group of subscribers have members in both communication systems, the systems interface establishes satellite communication links for each subscriber affiliated with the satellite communication system and establishes a terrestrial communication link for subscribers affiliated with a terrestrial communication system. Once the communication links are established, the systems interface arbitrates transmissions of the group of subscribers. The arbitration of transmissions insures that each subscriber in the group of subscribers receives the transmission. With such a method and apparatus, group communications can be established between subscribers affiliated with terrestrial communication systems and subscribers affiliated with satellite communication systems such that subscribers in remote areas can participate in terrestrial group communications. In addition, each of the subscribers, whether affiliated with the satellite system or terrestrial system, does not require a high performance audio vocoder. As such, typical audio vocoders, which are currently used in many communication systems, are adequate to fulfill the vocoding needs of subscribers.

Figure 1:
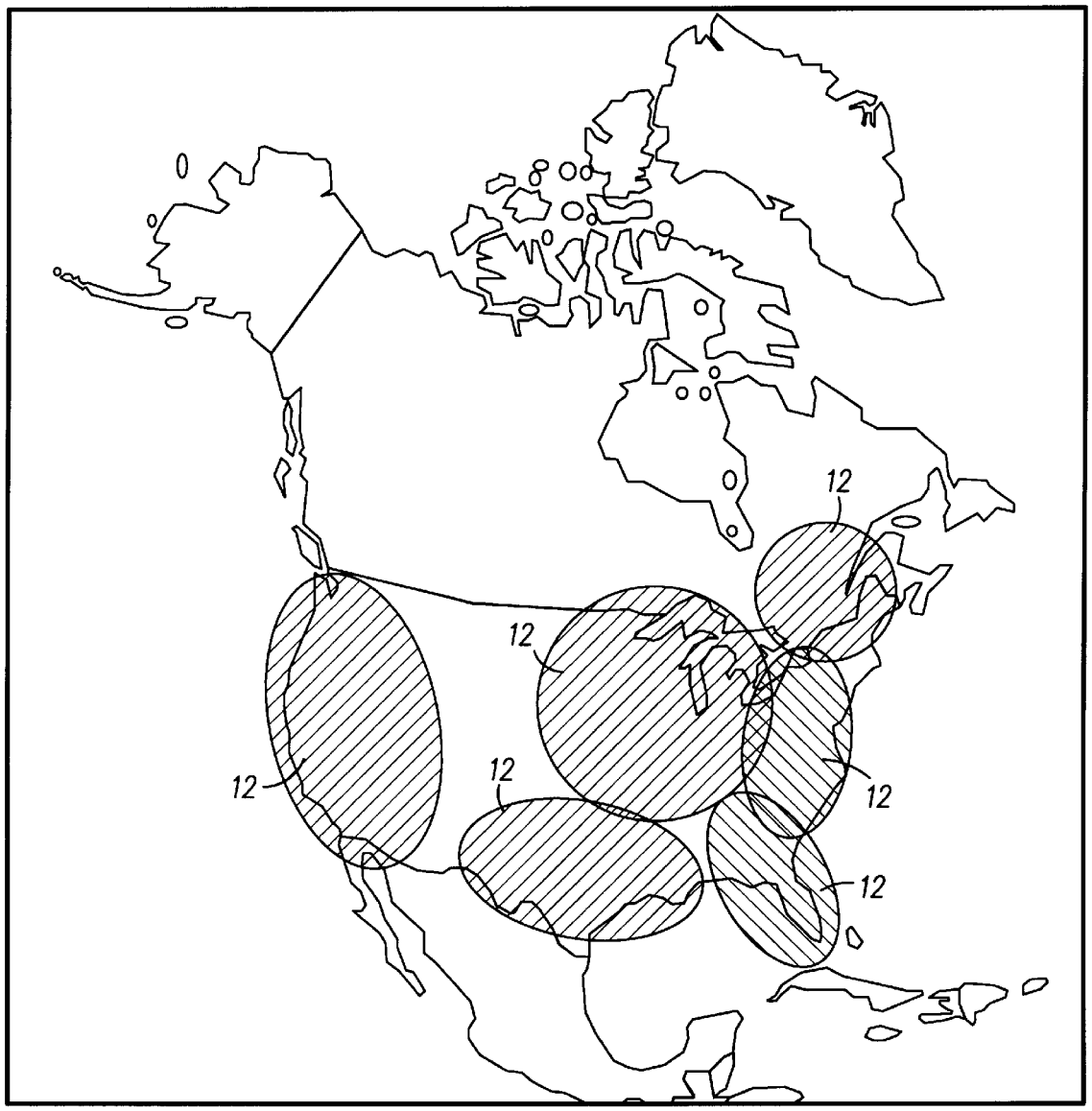
FIG. 1 illustrates a graphical representation of terrestrial communication systems' coverage areas and a satellite communication system's coverage area in accordance with the present invention.

The present invention can be more fully described with reference to FIGS. 1–10. FIG. 1 illustrates a graphical representation of a geographic area that includes North and Central America. Overlaying the North American continent is a plurality of terrestrial communication systems 12. The cross hatched area indicates the coverage area provided by each of the terrestrial communication systems 12. As such, any subscriber unit located within the geographic boundaries of a terrestrial communication system can access the terrestrial system and have wireless communication services provided therefor. As shown, there are geographic regions within North America that are not covered by a terrestrial communication system 12. As such, subscribers in the non-covered areas do not have access to the terrestrial communication systems and therefore cannot participate in terrestrial communications wireless services.

FIG. 1 also illustrates a satellite system coverage area 10. As contemplated by many satellite communication systems, such as an IRIDIUM system, the entire world will be under the coverage area of the satellite system. Thus, all of North America and Central America will be in the coverage area of satellite system 10.

Figure 2:
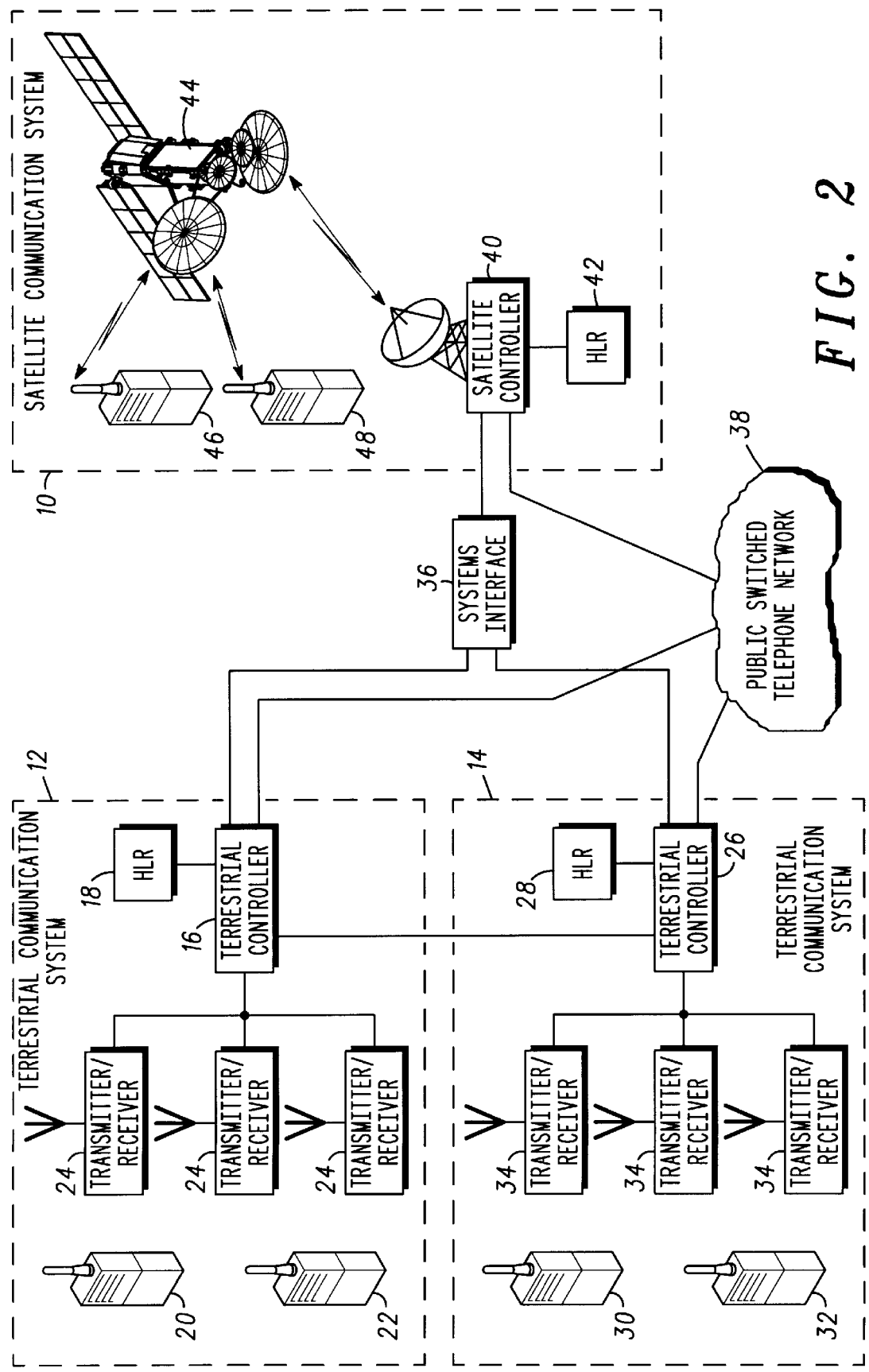
FIG. 2 illustrates a schematic block diagram of a terrestrial communication systems and a satellite communication system coupled together in accordance with the present invention.

FIG. 2 illustrates a schematic block diagram of terrestrial communication systems 12 and 14 and the satellite communication system 10 operably coupled together via a systems interface 36. The terrestrial communication systems 12 and 14 each include a terrestrial controller 16, 26, a home location register ("HLR") 18, 28, a plurality of base station transceivers 24, 34, and a plurality of subscribers 20, 22, 30, and 32. The subscribers may be dual mode subscribers such that they are operable in either the terrestrial communication system 12, 14 or the satellite communication system 10. The subscribers may further be cellular telephones, mobile radios, portable radios, personal digital assistants, personal computers equipped with a wireless modem, or any other device that receives and/or transmits information via a wireless RF communication path.

The terrestrial communication systems 12 and 14 may be digital systems or analog systems. In either case, the terrestrial controller 16, 26, controls and processes service requests to and from the plurality of subscribers. Such services include, for example, but are not limited to, dispatch communications, group communications, telephone interconnect services, and data transmissions. The terrestrial controller 16, 26 processes services for subscribers affiliated thereto by accessing its local HLR 18, 28. The HLR 18, 28 stores the identity of the subscriber unit, its talk group IDs (which may be a single talk group, a plurality of talk groups or a hierarchical talk grouping), the services that the subscriber unit has subscribed to, and its home location. The home location for subscribers 20 and 22 is the terrestrial communication system 12 while the home location for subscribers 30 and 32 is terrestrial system 14.

The terrestrial controllers 16 and 26 are coupled to a systems interface 36 and to a public switch telephone network ("PSTN") 38. The terrestrial controllers 16 and 26 are system controllers and/or mobile switching centers such as the ones employed in Motorola's SMARTZONE and/or IDEN land mobile communication systems. The controllers process all of the service requests directly, or via a service processor, for the subscribers.

The satellite communication system 10 includes a satellite controller 40, an HLR 42, at least one satellite 44 and subscribers 46–48. Subscribers 46 and 48 are dual mode subscriber units that are typically affiliated with a terrestrial communication system 12 and/or 14. These subscribers 46 and 48, however, may be in a geographic area in which the terrestrial communication systems 12 and 14 do not provide service. As such, they have affiliated with the satellite communication system 10. The satellite controller 40 processes services for the subscribers 46 and 48 while these subscribers are affiliated with the satellite communication system. The satellite controller 40 is coupled to the systems interface 36 and to the PSTN 38 to facilitate service processing.

The systems interface 36 allows subscribers 46 and 48 affiliated with the satellite system to participate in group communications with subscribers 20, 22, 30, and/or 32 that are affiliated with terrestrial systems. The group communications may be initiated by any of the subscribers 20, 22, 30, 32, 46, 48 wherein the request is sent to the subscriber unit's local controller (i.e., terrestrial controller 16, 26 or satellite controller 40), and subsequently routed to the systems interface 36. The systems interface 36 processes the request to establish satellite communication links for each subscriber located in the satellite communication system 10 and establishes a terrestrial communication link for subscribers in a terrestrial communication system 12. Note that if subscribers are located in communication system 12 and communication system 14, a terrestrial communication link is established in each communication system 12, 14. With the communication links established, the systems interface 36 arbitrates the transmissions such that the group communication is established. The arbitration of transmissions will be discussed with reference to FIGS. 3, 6 and 7 below.

Figure 3:
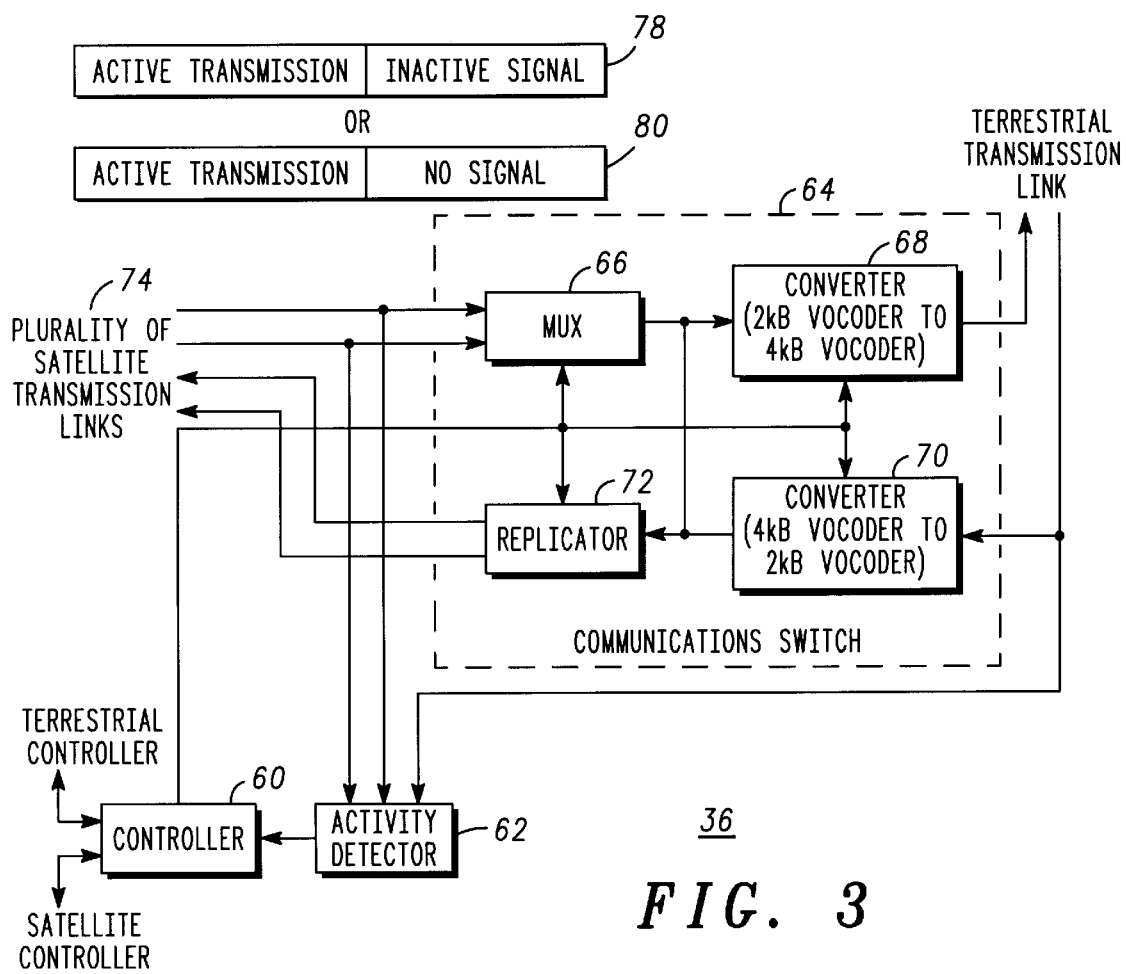
FIG. 3 illustrates a schematic block diagram of a systems interface in accordance with the present invention.

FIG. 3 illustrates a schematic block diagram of the systems interface 36. The systems interface 36 includes a controller 60, an activity detector 62, and a communications switch 64. The communications switch 64 includes a multiplexer 66, a first converter 68, a second converter 70, and a replicator 72. Controller 60 is a processing device such as a microprocessor, microcomputer, digital signal processor, central processing unit, computer, work station, and/or any device that manipulates data based on programming instructions. The programming instructions cause the controller 60 to facilitate the establishment of group communications between subscribers affiliated with a terrestrial communication system and subscribers affiliated with a satellite communication system. Such programming instructions will be discussed in greater detail with reference to FIGS. 5–10.

The controller 60 communicates with the terrestrial controllers 16, 26 and the satellite controller 40. Such communication includes establishing the group communication, terminating the group communication, establishing the communication links, and/or maintaining the group communication.

Once the group communication has been established, a plurality of satellite transmission links 74 and the terrestrial transmission link 76 are monitored for active transmissions by the activity detector 62. An active transmission may be a voice transmission and/or data transmission. To facilitate a group communication, the systems interface 36 arbitrates the active transmissions. As such, if one subscriber affiliated with the satellite system is communicating, the systems interface insures that other subscribers of the group communication receive the transmission by controlling transmissions on the links. Thus, if the activity detector 62 detects an active transmission on one of the satellite transmission links 74, or the terrestrial transmission link 76, it provides an indicative signal to controller 60. The detection of the active transmission may be done by actually detecting an analog or digitized voice signal, by detecting the absence thereof, or by detecting a non-transmitting signal such that each subscriber that is transmitting a non-transmitting signal is in a non-active transmission state.

If the active transmission was detected on the terrestrial communication link 76, the controller 60 activates converter 70. Converter 70 converts the terrestrial formatted transmission into a satellite-formatted transmission. In the example shown in the figure, if the terrestrial system is a Motorola SMARTZONE communication system and the satellite system is an IRIDIUM system, the subscribers in the terrestrial system are equipped with a 4 kbps vocoder while the subscribers in the satellite system are equipped with a 2 kbps vocoder. As such, to convert from terrestrial formatted transmission to a satellite formatted transmission, the 4 kbps to 2 kbps conversion is performed.

Having made this conversion, converter 70 outputs the converted transmission to replicator 72. Replicator 72, activated by controller 60, copies the converted transmission into N copies. The number of copies is dependent upon the number of subscribers that are affiliated with the satellite communications system. For example, if there are four subscribers affiliated with the satellite communications system, there are four satellite transmission links established and thus four copies of the converted transmission need to be produced. The replicator 72 then provides the resulting copies to the plurality of satellite transmission links, which subsequently route the converted data to the respective subscribers.

If, however, the activity detector 62 detected an active transmission on one of the plurality of satellite transmission links 74, the activity detector 62 provides an indication thereof to the controller 60. In response to the indication, controller 60 activates multiplexer 66 to pass the active transmission from the particular satellite transmission link to converter 68. Converter 68 converts the satellite formatted transmission into a terrestrial formatted transmission. In the example shown in the figure, this conversion may be from a 2 kbps vocoded signal to a 4 kbps vocoded signal. The output of converter 68 is provided to the terrestrial transmission link 76 such that subscribers that are participating in the group communication and that are affiliated with the terrestrial communication system receive the converted transmission.

In addition to providing the output of multiplexer 66 to the converter 68, the output is provided to replicator 72. Replicator 72, based on a control signal from controller 60, outputs the active transmission onto the other satellite transmission links. In other words, the replicator outputs N−1 copies of the active transmission, one copy on each of the other satellite communication links. Thus, each subscriber in the group call receives the transmission.

FIG. 3 further illustrates the formatting of the transmissions over the satellite transmission links 74. In one embodiment, the transmissions 78 may include the active transmission and an inactive signal. The inactive signal is a signal generated by the subscribers to indicate that they are not transmitting voice and/or data. As an alternate transmission 80, the subscriber affiliated with the satellite system may transmit the active transmission and then provide no signal when it is not actively transmitting. In either case, the activity detector 68 is appropriately equipped to detect active transmissions.

Figure 4:
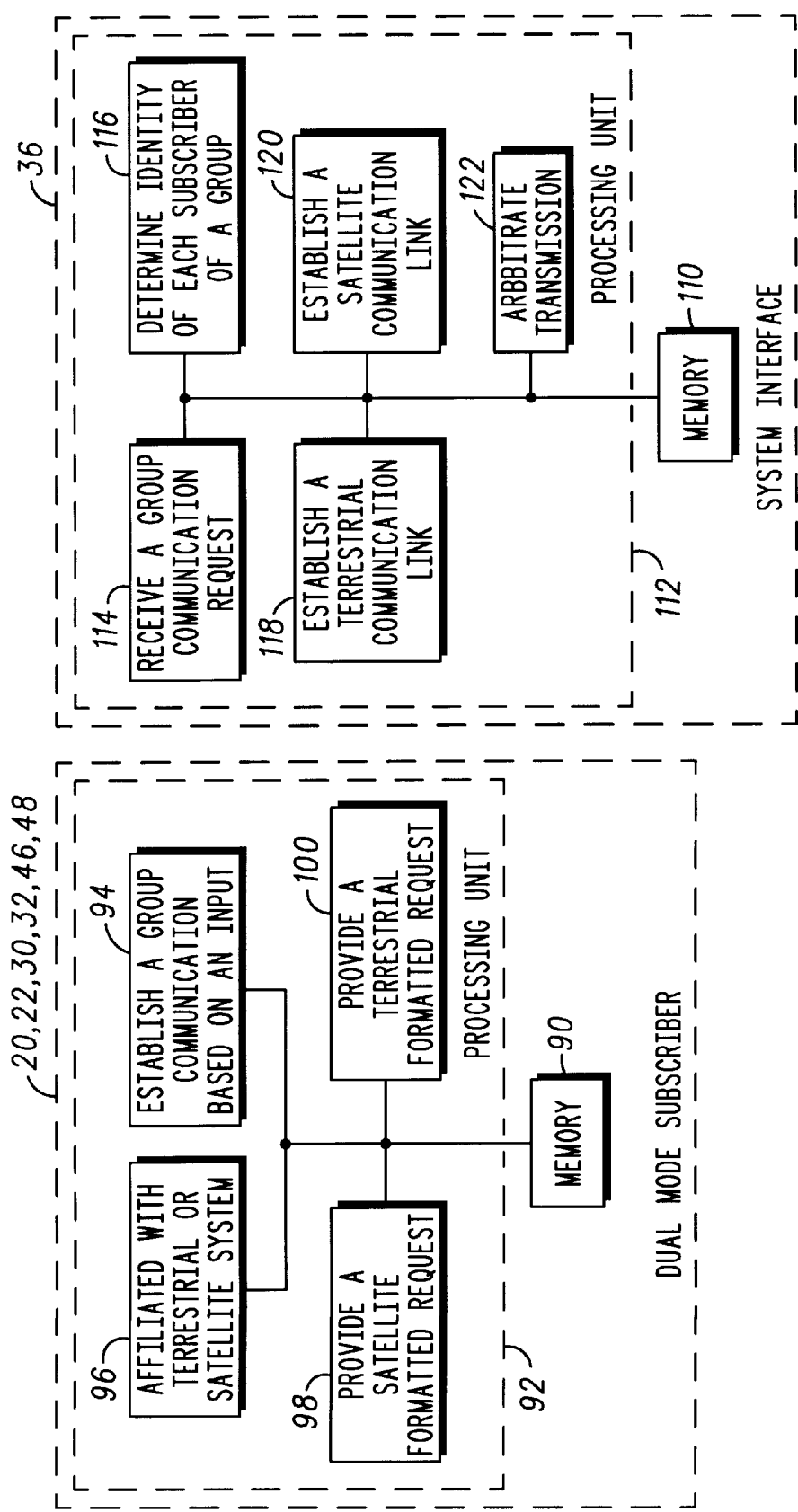
FIG. 4 illustrates a schematic block diagram of a dual mode subscriber and a systems interface both of which are in accordance with the present invention.

FIG. 4 illustrates a schematic block diagram of the dual mode subscriber 20, 22, 30, 32, 46 and 48 and the systems interface 36. The dual mode subscriber 20, 22, 30, 32, 46 and 48 are operable in either the terrestrial communications system 12, 14 or the satellite communications system 10. The RF transceiver portion (not shown), of the dual mode subscriber includes the appropriate hardware and/or software to switch between the RF frequencies of the terrestrial system and the RF frequencies of the satellite system. The dual mode subscriber is shown to include a processing unit 92 and memory 90. The processing unit 92 may be a microprocessor, microcontroller, microcomputer, central processing unit, digital signal processor, or any device that manipulates digital information based on programming instructions. The memory 90 may be read-only memory, random access memory, floppy disk memory, hard disk memory, magnetic memory, CD ROM memory, DVD ROM memory, or any other means for storing digital information.

Memory 90 stores programming instructions that, when read by the processing unit 92, cause the processing unit 92 to function as a plurality of circuits 94–100. While reading the programming instructions, the processing unit 92 functions as a circuit 94 to establish a group communication based on a group communication input. Next, the processing unit 92 functions as circuit 96 to determine whether the subscriber unit is affiliated with the terrestrial communications system or the satellite communication system. If the subscriber is affiliated with the terrestrial communication system, the processing unit will function as circuit 100 to provide a terrestrial formatted group communication request. If, however, the subscriber is affiliated with the satellite communication system, the processing unit will function as circuit 98 to provide a satellite formatted group communication request.

The systems interface 36 includes a processing unit 112 and memory 110. The processing unit 112 may be a microprocessor, micro-controller, digital signal processor, central processing unit, personal computer, or any other device that manipulates digital information based on programming instructions. The memory 110 may be read-only memory, random access memory, floppy disk memory, reprogrammable memory, hard disk memory, magnetic tape memory, CD memory, DVD memory, or any other device that stores digital information.

Memory 110 stores programming instructions that, when read by the processing unit 112, causes the processing unit 112 to function as a plurality of circuits 114–122. When reading the programming instructions, the processing unit 112 functions as circuit 114 to receive a group communication request. Next, the processing unit 112 functions as circuit 116 to determine identity of each subscriber of the group or identity of the subscribers that are affiliated with the satellite communication system. Having done this, the processing unit functions as a circuit 118 to establish a terrestrial communication link. Next, the processing unit 112 functions as circuit 120 to establish a satellite communication link for each subscriber affiliated with the satellite communication system. Next, the processing unit functions as circuit 122 to arbitrate between transmissions until the group communication has been terminated. The processing of the programming instructions by processing unit 92 and processing unit 112 will be discussed in greater detail with reference to FIGS. 5 through 10.

Figure 5:
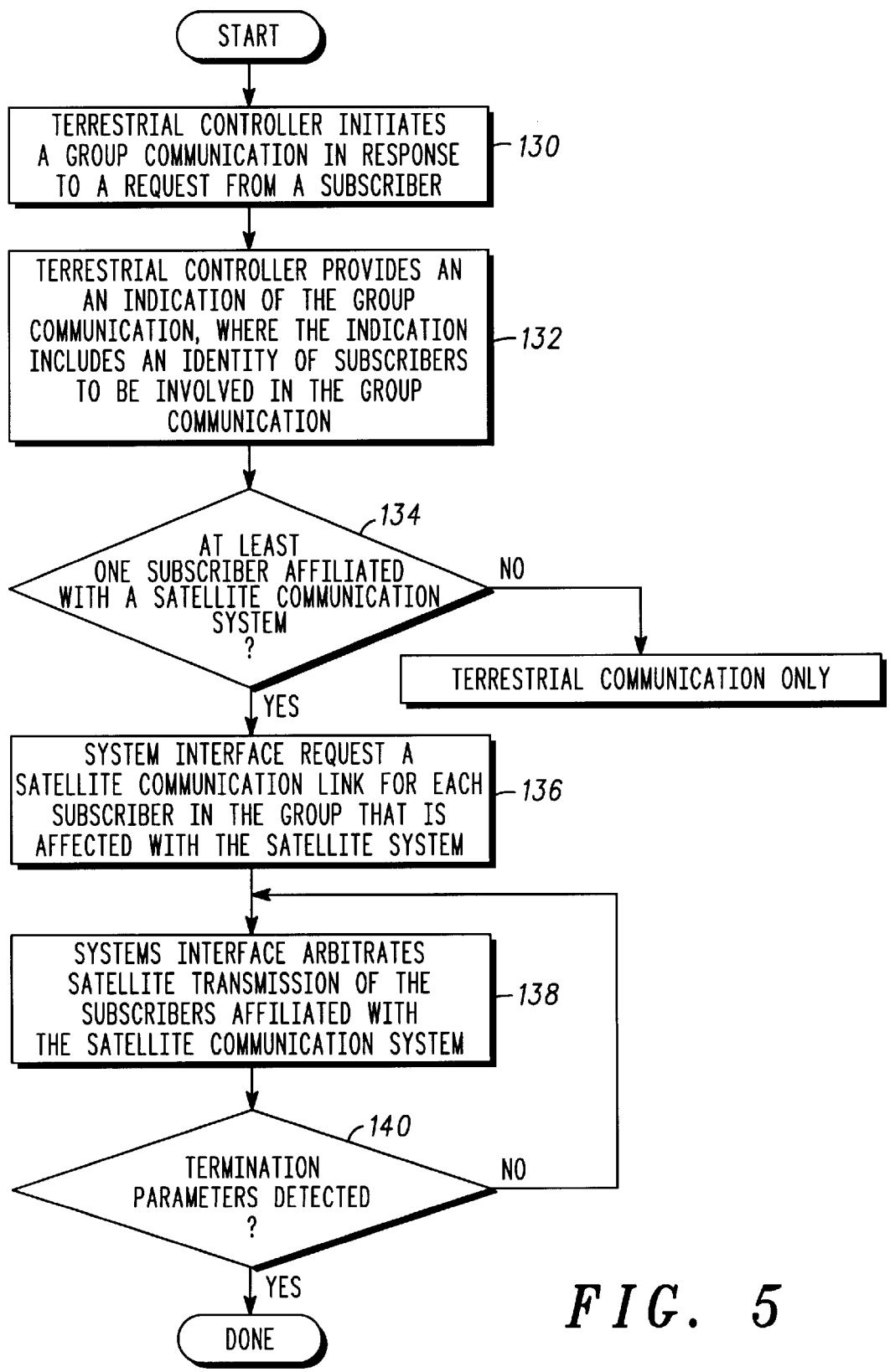
FIG. 5 illustrates a logic diagram of a method for providing group communications between subscribers affiliated with a terrestrial communication system and subscribers affiliated with a satellite communication system in accordance with the present invention.

FIG. 5 illustrates a logic diagram of a method for establishing group communications between subscribers affiliated with a terrestrial communication system and subscribers affiliated with a satellite communication system. The process begins at step 130 where a terrestrial controller initiates a group communication in response to a request from a subscriber. The request from the subscriber includes the identity of each subscriber that is targeted to participate in the group communication. The identity may be established by a list of individual identification codes of the subscribers or a group identification code. The process then proceeds to step 132 where the terrestrial controller provides an indication of the group communication. The indication includes the identity of subscribers to be involved in the group communication. The identities of the subscribers may include all of the subscribers involved in the group communication or only the identity of subscribers that are not affiliated with the terrestrial communication system. If the terrestrial controller only provides a list of subscribers that are not affiliated with the terrestrial system, the terrestrial controller would first identify those subscribers that are not affiliated with the terrestrial system. Next, the terrestrial controller would determine whether the subscribers that aren't affiliated with the terrestrial system are dual mode subscribers. For the dual mode subscribers that are not affiliated with the terrestrial communication system, the terrestrial controller would provide their identities to the systems interface.

The process then proceeds to step 134 where a determination is made as to whether at least one subscriber is affiliated with the satellite communication system. Regardless of whether the systems interface received a complete list of subscribers to participate in the group communication or only a list of subscribers that aren't affiliated with the terrestrial system, the systems interface queries a satellite controller as to whether at least one of the subscribers in the list is affiliated with the satellite communication system. The systems interface will subsequently receive a response from the satellite controller indicating which of the subscribers are affiliated with the satellite communication system. If the systems interface determines that none of the subscribers are affiliated with the satellite communication system, a terrestrial communication is established.

If, however, at least one subscriber is affiliated with the satellite communication system, the process proceeds to step 136. At step 136, the systems interface requests a satellite communication link for each subscriber in the group of subscribers that is affiliated with the satellite communication system. The request for the satellite communication links can be done in a similar manner as targeting a subscriber unit as a recipient of an incoming communication. Once the satellite communication links are established, the process proceeds to step 138. At step 138, the systems interface arbitrates satellite transmissions of the subscribers affiliated with the satellite communication system. This process will be discussed in greater detail with reference to FIGS. 6 and 7. Next, the process proceeds to step 140 where a determination is made as to whether termination parameters have been detected. If not, the process continues to arbitrate the transmissions until a termination parameter is detected. Such termination parameters include a time-out period with no active transmissions and/or a termination signal generated by one of the subscriber units.

Figure 6:
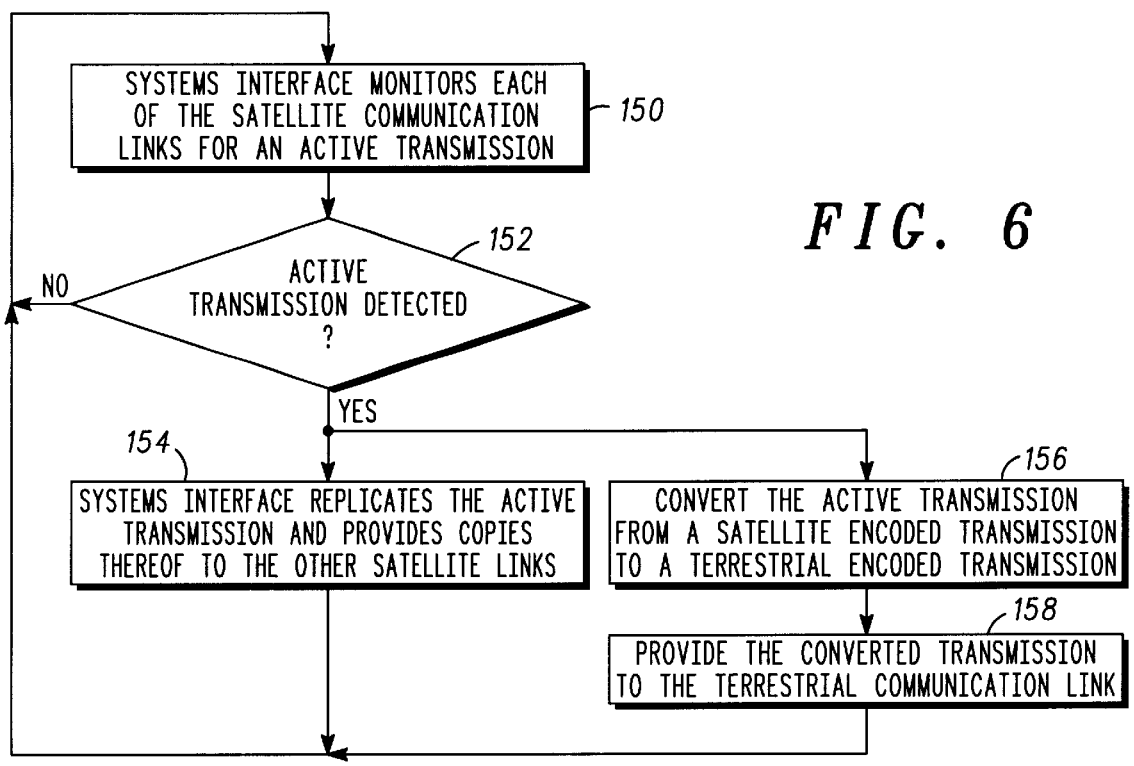
FIG. 6 illustrates a schematic block diagram of a method for monitoring transmissions on satellite communication links in accordance with the present invention.

FIG. 6 illustrates a logic diagram of a method for arbitrating transmissions in accordance with the present invention. The process begins at step 150 where the systems interface monitors each of the satellite communication links for an active transmission. The process then proceeds to step 152 where a determination is made as to whether any active transmissions have been detected. An active transmission may be detected by detecting a signal that indicates active transmission, by detecting a digital and/or analog speech signal, or by detecting a signal that indicates speech is not present. If an active transmission is not detected, the process waits until one is detected.

Once an active transmission is detected, the process proceeds to steps 154 and 156. At step 154, the systems interface replicates the active transmission and provides copies thereof to the other satellite transmission links. At step 156, the systems interface converts the active transmission from a satellite encoded transmission to a terrestrial encoded transmission. As an example of the conversion, assume that the terrestrial system is a SMARTZONE land mobile two-way communication system and the satellite communication system is an IRIDIUM system. In these systems, a subscriber unit in the terrestrial system utilizes a 4 kbps vocoder, while a satellite system subscriber uses a 2 kbps vocoder. Thus, the conversion would be from a 2 kbps vocoded signal to a 4 kbps vocoded signal. By performing the conversion in this manner, high performance vocoders are not needed within the subscribers. As such, most currently available subscribers can take advantage of the present invention.

Once the active transmission has been converted, the process proceeds to step 158. At step 158, the converted transmission is provided to the terrestrial communication link. Once on the terrestrial communication link, all subscribers affiliated with the terrestrial system will receive the transmission.

Figure 7:
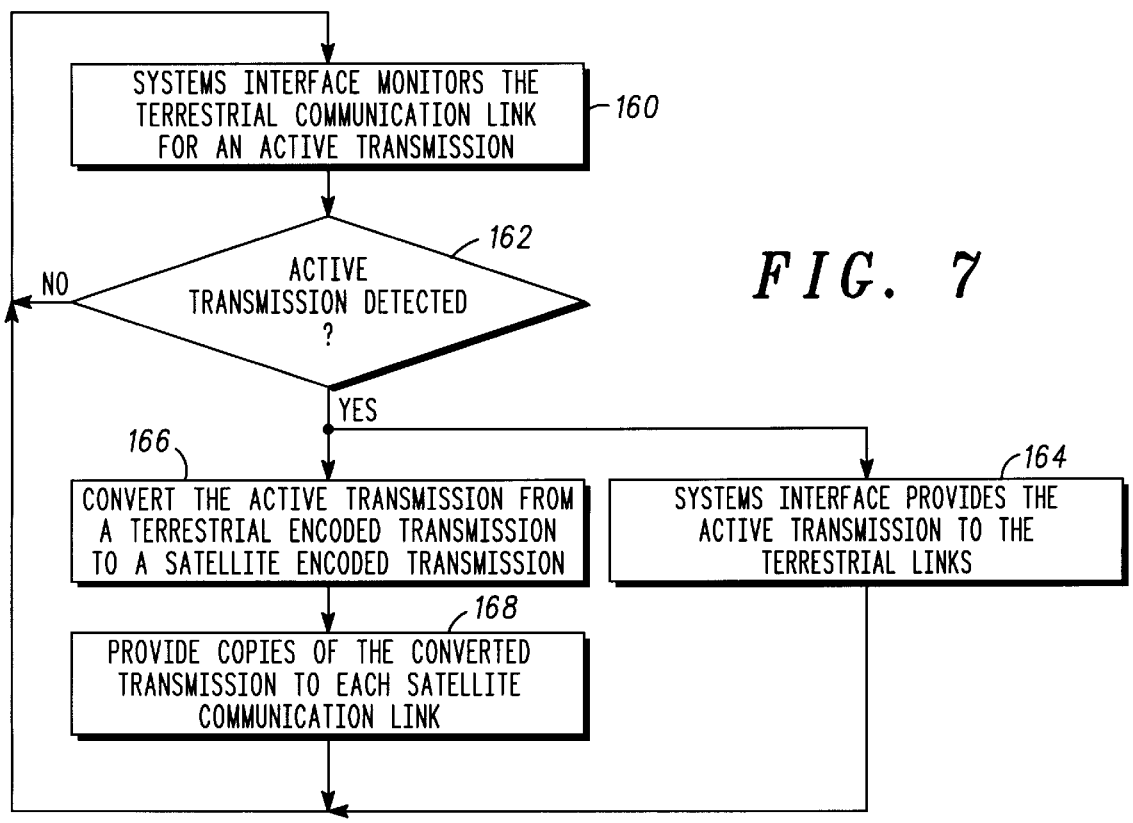
FIG. 7 illustrates a logic diagram of a method for monitoring transmissions on a terrestrial communication link in accordance with the present invention.

FIG. 7 illustrates a logic diagram of another method for arbitrating transmissions by the systems interface. The process begins at step 160 where the systems interface monitors the terrestrial communication link for an active transmission. The process then proceeds to step 162 where a determination is made as to whether an active transmission has been detected. If not, the process waits until one is detected. Once an active transmission has been detected, the process proceeds to steps 164 and 166. At step 164, the systems interface provides the active transmission to the terrestrial transmission link. As such, a terrestrial originated transmission is treated within the terrestrial system as a typical group communication.

At step 166, the active transmission is converted from a terrestrial encoded transmission to a satellite encoded transmission. From the example given above, the 4 kbps vocoded signal is converted into a 2 kbps vocoded signal. The process then proceeds to step 168 where copies of the converted transmission are provided to each satellite communication link. As such, the copies are provided to the subscribers of the satellite communication as if the subscriber were involved in a one-to-one communication. However, by arbitrating the transmissions in this manner, subscribers affiliated with the satellite communication system can participate in group communications with other subscribers affiliated to the satellite system and with subscribers affiliated with a terrestrial system. By allowing group communications in this manner, subscribers located in geographic areas that are not supported by terrestrial systems are able to participate in group communications.

Figure 8:
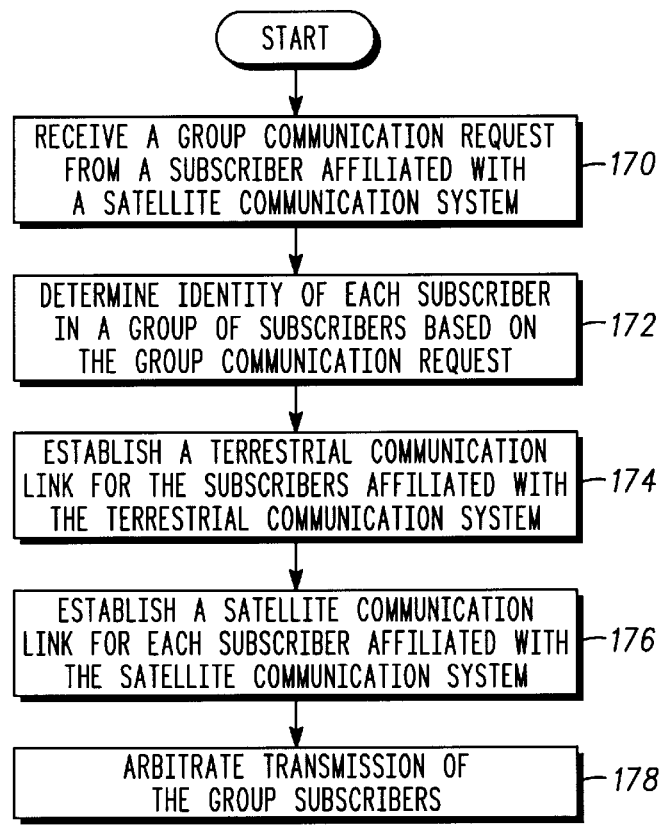
FIG. 8 illustrates a logic diagram of an alternate method for processing the group communications between subscribers of a terrestrial communication system and subscribers of a satellite communication system in accordance with the present invention.

FIG. 8 illustrates a logic diagram of a method, executable by the systems interface, for establishing group communication between subscribers affiliated with the terrestrial communication system and subscribers affiliated with a satellite communication system. The process begins at step 170 where the systems interface receives a group communication request from a subscriber affiliated with the satellite communication system. The request includes a satellite access code dedicated to the systems interface. The systems interface, when it receives the satellite access code, which may be a satellite telephone number, recognizes it as a request for a group communication for a particular group.

The process then proceeds to step 172 where the systems interface determines the identity of each subscriber in a group of subscribers based on the group communication request. The identity of the subscribers includes at least one of an individual identification code of the subscriber, a group identification code, a terrestrial communication system identification code, and a satellite communication system identification code. The process then proceeds to step 174 where the systems interface establishes a terrestrial communication link for the subscribers affiliated with the terrestrial communication system. The terrestrial communication link is established by providing the terrestrial controller an indication that a group communication has been requested for the particular group. The terrestrial controller processes the group communication like any other terrestrial group communication.

The process then proceeds to step 176 where the systems interface establishes a communication satellite link for each subscriber affiliated with the satellite communication system. Each of the satellite communication links can be established by informing the satellite controller that the subscriber is a target of a communication. The satellite controller does not need to know or be informed that the subscriber is to participate in a group communication. The process proceeds to step 178 where the systems interface arbitrates transmissions of the group of subscribers. Such arbitration may be done as described previously with reference to FIGS. 6 and 7.

Figure 9:
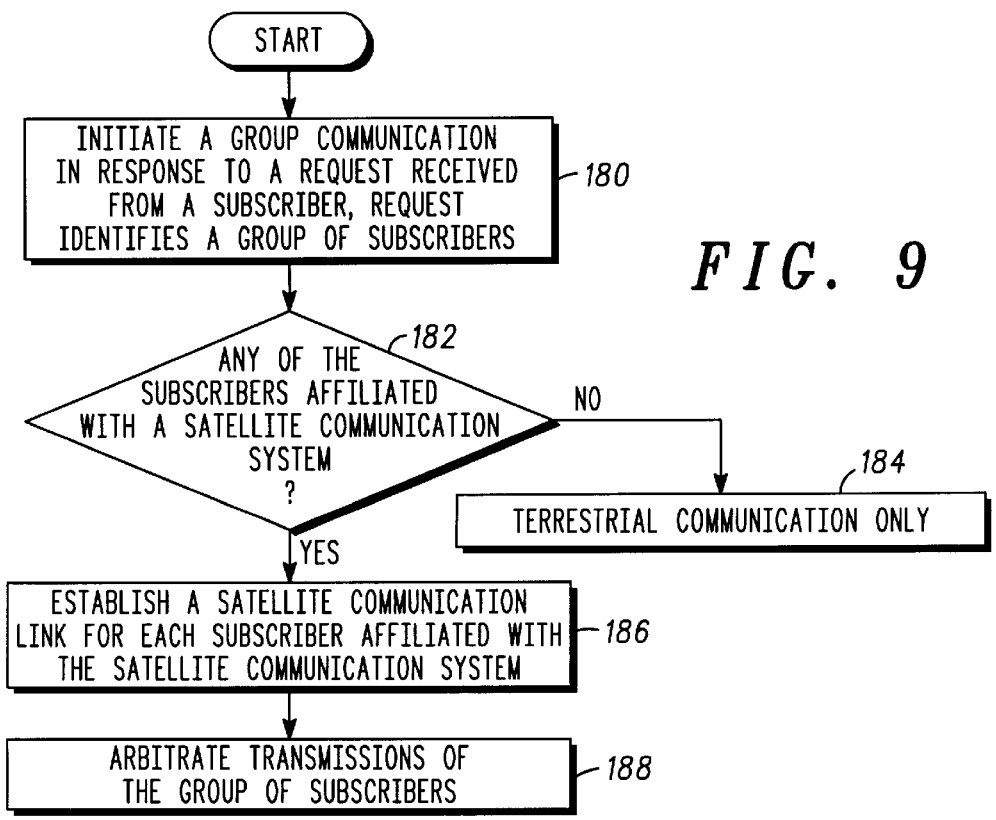
FIG. 9 illustrates a logic diagram of another alternate method for processing group communications between subscribers of a terrestrial communication system and subscribers of a satellite communication system in accordance with the present invention.

FIG. 9 illustrates a logic diagram of an alternate method for the systems interface to establish a group communication. The process begins at step 180 where the systems interface initiates a group communication in response to a request received from a subscriber, where the request identifies a group of subscribers. The systems interface receives the request from the subscriber via the terrestrial controller or the satellite controller. The process then proceeds to step 182 where a determination is made as to whether any of the subscribers are affiliated with the satellite communication system. If not, the process proceeds to step 184 where a terrestrial group communication only is established.

If, however, at least one subscriber is affiliated with the satellite communication system, the process proceeds to step 186. At step 186, the systems interface establishes a satellite communication link for each subscriber affiliated with the satellite communication system. The process then proceeds to step 188 where the systems interface arbitrates transmissions for the group of subscribers.

Figure 10:
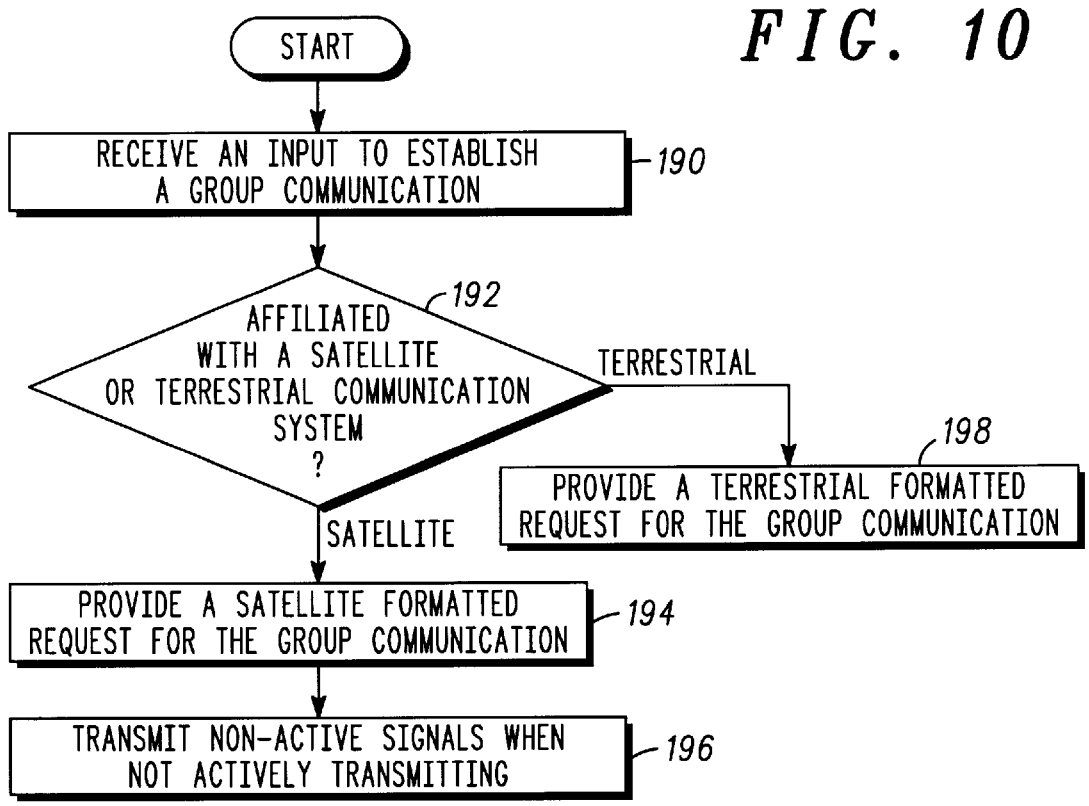
FIG. 10 illustrates a logic diagram of a method for a subscriber to establish a group communication between subscribers in a terrestrial communication system and subscribers in a satellite communication system in accordance with the present invention.

FIG. 10 illustrates a logic diagram of a method for a subscriber unit to establish a group communication between subscribers affiliated with terrestrial communication system and subscribers affiliated with a satellite communication system. The process begins at step 190 where the subscriber receives an input to establish the group communication. The input may be received via a keypad, selector knob, or any other input device. The process then proceeds to step 192 where a determination is made as to whether the subscriber unit is affiliated with the satellite communication system or the terrestrial communication system. Identifying the frequency that the RF transceiver is monitoring makes such a determination. Alternatively, the RF transceiver could provide a control signal indicating which system it is affiliated with.

If the subscriber is affiliated with the satellite system, the process proceeds to step 194 where the subscriber provides a satellite formatted request for the group communication. The satellite formatted request includes a satellite communication access code which is provided to the systems interface. The satellite communication access code may be a telephone number that the systems interface recognizes as a request for a group communication for a particular group. Note that the subscriber may be a member of a plurality of groups such that to establish a group communication for any one of the groups, it would have to select a corresponding satellite communication system access code. If the subscriber is a member to a plurality of communication groups, it would include a table that stores the satellite communication system access codes for each group.

Having provided the satellite formatted request, the process proceeds to step 196. At step 196, the subscriber unit may transmit non-active signals when it is not actively transmitting. As such, when the subscriber unit is not transmitting a voice and/or data signal, it is transmitting an inactive signal such that the systems interface knows that it is in an inactive transmission state. Alternatively, the subscriber may provide no information while it is not transmitting.

If the subscriber unit is affiliated with the terrestrial communication system, the process proceeds to step 198. At step 198, the subscriber provides a terrestrial formatted request for the group communication. The terrestrial formatted group request is typical for a terrestrial communication system.

The preceding discussion has presented a method and apparatus for providing group communications between subscribers affiliated with a terrestrial communications system and subscribers affiliated with a satellite communications system. By incorporating a systems interface to arbitrate between transmissions of the subscribers affiliated with the satellite system and the subscribers affiliated with the terrestrial system, the group communication can be established. In addition, by establishing the group communication in this manner, the subscribers are not required to have a high quality vocoder. As such, subscribers can use a 4 kbps vocoder for less.

We claim:

1. A method for establishing group communications between subscribers affiliated with a terrestrial communication system and subscribers affiliated with a satellite communication system, the method comprising the steps of:

a) initiating, by a terrestrial controller, a group communication in response to a request from a subscriber affiliated with the terrestrial communication system;

b) providing, by the terrestrial controller, an indication of the group communication to a systems interface, wherein the indication includes an identity of at least one subscriber that is to be a participant in the group communication;

c) determining, by the systems interface, whether the at least one subscriber is affiliated with the satellite communication system;

d) when the at least one subscriber is affiliated with the satellite communication system, requesting, by the systems interface, a separate satellite communication link for each of the at least one subscriber affiliated with the satellite communication system; and e) when the satellite communication link is established, arbitrating, by the systems interface, satellite transmissions of the at least one subscriber.

2. The method of claim 1 further comprising, within step (b), determining, by the terrestrial controller, that the at least one subscriber is not affiliated with the terrestrial communication system;

determining, by the terrestrial controller, whether the at least one subscriber is a dual mode subscriber; and when the at least one subscriber is a dual mode subscriber, generating the indication.

3. The method of claim 1 further comprising, within step (c), querying a satellite controller as to whether the at least one subscriber is affiliated with the satellite communication system; and receiving a response from the satellite controller that the at least one subscriber is affiliated with the satellite communication system.

4. The method of claim 1 further comprising, within step (c), receiving, by the systems interface, identities of a plurality of subscribers, wherein each of the plurality of subscribers is targeted as a participant in the group communication; and determining, by the systems interface, whether any of the plurality of subscribers are affiliated with the satellite communication system.

5. The method of claim 4 further comprising, within steps (d) and (e), determining, by the systems interface, that a plurality of the subscribers are affiliated with the satellite communication system;

requesting a separate satellite communication link for each of the plurality of subscribers that is determined by the systems interface to be affiliated with the satellite communication system, defining a plurality of satellite communication links;

monitoring each of the plurality of satellite communication link for an active transmission;

when an active transmission is detected on one of the plurality of satellite communication links, providing a representation of the active transmission to other satellite communication links of the plurality of satellite communication links and to a terrestrial communication link.

6. The method of claim 5 further comprising detecting the active transmission by at least one of: detecting a first signal that indicates the active transmission, detecting a digital speech signal, and detecting a second signal that indicates that the digital speech signal is not present.

7. The method of claim 5 further comprising:

providing the representation of the active transmission as a copy of the active transmission to each of the other satellite communication links;

converting the active transmission from a satellite encoded transmission to a terrestrial encoded transmission to produce a converted transmission; and providing the converted transmission as the representation of the active transmission to the terrestrial communication link.

8. The method of claim 5 further comprising monitoring the plurality of satellite communication links and a terrestrial communication link for the active transmission, wherein the active transmission is formatted in at least one of: analog signaling format and digital signaling format.

9. The method of claim 4 further comprising, within steps (d) and (e), determining, by the systems interface, that a plurality of the subscribers are affiliated with the satellite communication system;

requesting a separate satellite communication link for each of the plurality of subscribers that is determined by the systems interface to be affiliated with the satellite communication system, defining a plurality of satellite communication links;

monitoring a terrestrial communication link for an active transmission;

when an active transmission is detected on the terrestrial communication link, providing a representation of the active transmission to the plurality of satellite communication links.

10. The method of claim 9 further comprising:

converting the active transmission from a terrestrial encoded transmission to a satellite encoded transmission to produce a converted transmission; and providing a copy of the converted transmission as the representation of the active transmission to each of the plurality of satellite communication links.

11. The method of claim 1 further comprising ending the group communication based on termination parameters that include at least one of: a time-out period with no active transmission and a termination signal.

12. A method for establishing group communications between subscribers affiliated with a terrestrial communication system and subscribers affiliated with a satellite communication system, the method comprising the steps of:

a) receiving a group communication request from a subscriber;

b) determining an identity of each subscriber of a group of subscribers based on the group communication request, wherein each subscriber of the group of subscribers is to be part of a group communication;

c) establishing a terrestrial communication link for subscribers of the group of subscribers that are affiliated with the terrestrial communication system;

d) establishing a separate satellite communication link for each subscriber of the group of subscribers that is affiliated with the satellite communication system; and e) arbitrating transmissions of the group of subscribers.

13. The method of claim 12 further comprising, within steps (a) and (b), receiving the group communication request that includes a satellite access code dedicated to a systems interface, wherein, based on the satellite access code, the systems interface identifies the group of subscribers.

14. The method of claim 12 further comprising, within step (b), determining the identity by identifying, for each subscriber in the group of subscribers, a group identification code, a terrestrial communication system identification code, and a satellite communication system identification code.

15. The method of claim 12 further comprising:

establishing a plurality of satellite communication links for subscribers of the group of subscribers that are affiliated with the satellite communication system;

monitoring each of the plurality of satellite communication links for an active transmission;

when the active transmission is detected on one of the plurality of satellite communication links, providing a representation of the active transmission to other satellite communication links of the plurality of satellite communication links and to the terrestrial communication link.

16. The method of claim 15 further comprising:

providing the representation of the active transmission as a copy of the active transmission to each of the other satellite communication links;

converting the active transmission from a satellite encoded transmission to a terrestrial encoded transmission to produce a converted transmission; and providing the converted transmission as the representation of the active transmission to the terrestrial communication link.

17. The method of claim 12 further comprising:

establishing a plurality of satellite communication links for subscribers of the group of subscribers that are affiliated with the satellite communication system;

monitoring a terrestrial communication link for an active transmission;

when the active transmission is detected on the terrestrial communication link, providing a representation of the active transmission to the plurality of satellite communication links.

18. The method of claim 17 further comprising:

converting the active transmission from a terrestrial encoded transmission to a satellite encoded transmission to produce a converted transmission; and providing a copy of the converted transmission as the representation of the active transmission to each of the plurality of satellite communication links.

19. A method for establishing group communications between subscribers affiliated with a terrestrial communication system and subscribers affiliated with a satellite communication system, the method comprising the steps of:

a) initiating a group communication in response to a request received from a subscriber, wherein the request identifies a group of subscribers;

b) determining whether at least one subscriber of the group of subscribers is affiliated with the satellite communication system;

c) when the at least one subscriber is affiliated with the satellite communication system, establishing a separate satellite communication link for each of the at least one subscriber affiliated with the satellite communication system; and d) when the satellite communication link is established, arbitrating transmissions of the group of subscribers.

20. The method of claim 19 further comprising establishing a terrestrial communication link when the group of subscribers includes a subscriber affiliated with the terrestrial communication system.

21. The method of claim 19 further comprising, within step (b), querying a satellite controller as to whether the at least one subscriber is affiliated with the satellite communication system; and receiving a response from the satellite controller that the at least one subscriber is affiliated with the satellite communication system.

22. The method of claim 19 further comprising:

establishing a plurality of satellite communication links for subscribers of the group of subscribers that are affiliated with the satellite communication system;

monitoring each of the plurality of satellite communication links for an active transmission;

when the active transmission is detected on one of the plurality of satellite communication links, providing a representation of the active transmission to other satellite communication links of the plurality of satellite communication links and to a terrestrial communication link.

23. The method of claim 19 further comprising:

establishing a plurality of satellite communication links for subscribers of the group of subscribers that are affiliated with the satellite communication system;

monitoring a terrestrial communication link for an active transmission;

when the active transmission is detected on the terrestrial communication link, providing a representation of the active transmission to the plurality of satellite communication links.

24. The method of claim 19 further comprising ending the group communication based on termination parameters that include at least one of: a time-out period with no active transmission and a termination signal.

25. A systems interface comprising:

an activity detection circuit operably coupled to detect active transmissions on a terrestrial communication link and on a plurality of satellite communication links by subscribers affiliated with respective terrestrial and satellite communication systems involved in a group communication;

a controller operably coupled to the activity detection circuit, wherein the controller receives an indication of a group communication request and facilitates establishment of the group communication by establishing the terrestrial communication link and the plurality of satellite communication links; and a communications switch operably coupled to the controller, the terrestrial communication link, and the plurality of satellite communication links, wherein the switch arbitrates transmissions on the terrestrial communication link and the plurality of satellite communication links based on a control signal from the controller.

26. The systems interface of claim 25 further comprising, within the communications switch, a converter that converts terrestrial system formatted communications into satellite system formatted communications.

27. The systems interface of claim 25 further comprising, within the communications switch, a converter that converts satellite system formatted communications into terrestrial system formatted communications.

28. A systems interface comprising:

a processing unit; and a memory operably coupled to the processing unit, wherein the memory stores programming instructions that, when executed by the processing unit, cause the processing unit to (a) receive a group communication request from a subscriber; (b) determine identity of each subscriber of a group of subscribers based on the group communication request, wherein each subscriber of the group of subscribers is to be part of a group communication; (c) establish a terrestrial communication link for subscribers of the group of subscribers that are affiliated with the terrestrial communication system; (d) establish a separate satellite communication link for each subscriber of the group of subscribers that is affiliated with the satellite communication system; and (e) arbitrate transmissions of the group of subscribers.

29. The systems interface of claim 28 further comprising, within the memory, programming instructions that, when executed by the processing unit, cause the processing unit to:

establish a plurality of satellite communication links for subscribers of the group of subscribers that are affiliated with the satellite communication system;

monitor each of the plurality of satellite communication links for an active transmission; and provide a representation of the active transmission to other satellite communication links of the plurality of satellite communication links and to the terrestrial communication link when the active transmission is detected on one of the plurality of satellite communication links.

30. The systems interface of claim 29 further comprising, within the memory, programming instructions that, when executed by the processing unit, cause the processing unit to:

provide the representation of the active transmission as a copy of the active transmission to each of the other satellite communication links;

convert the active transmission from a satellite encoded transmission to a terrestrial encoded transmission to produce a converted transmission; and provide the converted transmission as the representation of the active transmission to the terrestrial communication link.

31. The systems interface of claim 28 further comprising, within the memory, programming instructions that, when executed by the processing unit, cause the processing unit to:

establish a plurality of satellite communication links for subscribers of the group of subscribers that are affiliated with the satellite communication system;

monitor a terrestrial communication link for an active transmission;

provide a representation of the active transmission to the plurality of satellite communication links when the active transmission is detected on the terrestrial communication link.

32. The systems interface of claim 31 further comprising, within the memory, programming instructions that, when executed by the processing unit, cause the processing unit to:

convert the active transmission from a terrestrial encoded transmission to a satellite encoded transmission to produce a converted transmission; and provide a copy of the converted transmission as the representation of the active transmission to each of the plurality of satellite communication links.

* * * * *